United States Patent [19]
Stark et al.

[11] Patent Number: 5,773,760
[45] Date of Patent: Jun. 30, 1998

[54] UNIVERSAL ELECTRICAL COVER

[75] Inventors: Thomas S. Stark, Coral Springs, Fla.; Thomas J. Gretz, Clarks Summit, Pa.

[73] Assignee: Arlington Industries, Inc., Scranton, Pa.

[21] Appl. No.: 468,017

[22] Filed: Jun. 6, 1995

[51] Int. Cl.[6] .................................................... H02G 3/14
[52] U.S. Cl. ............................................ 174/66; 220/3.8
[58] Field of Search ....................... 174/66, 67; 220/241, 220/242, 3.8

[56] References Cited

U.S. PATENT DOCUMENTS

| | | | |
|---|---|---|---|
| 4,803,307 | 2/1989 | Shotey | 174/67 |
| 4,874,906 | 10/1989 | Shotey | 174/67 |
| 4,988,832 | 1/1991 | Shotey | 174/67 |
| 5,045,640 | 9/1991 | Riceman | 174/67 |
| 5,280,135 | 1/1994 | Berlin et al. | 174/67 |
| 5,380,956 | 1/1995 | Loo et al. | 174/17 CT |
| 5,477,010 | 12/1995 | Buckshaw et al. | 174/67 |

*Primary Examiner*—Kristine L. Kincaid
*Assistant Examiner*—Dhiru R. Patel

[57] ABSTRACT

A rain tight universal electrical box cover that will attach to most pre-existing, standard sized, flush or surface mounted electrical boxes and convert it into a rain tight outdoor electrical enclosure. The box cover accepts pre-existing standard electrical devices such as receptacles, switches, timers, and other similar devices and their pre-existing cover plates thereby eliminating the need to provide special provisions or numerous designs to accommodate the variety of electrical devices as is required with many of the popular electrical box covers that are commonly used in the industry today.

6 Claims, 3 Drawing Sheets

UNIVERSAL ELECTRICAL COVER

FIELD OF THE INVENTION

This invention relates to outdoor electrical boxes, and particularly, to an improved electrical cover that can mount over a standard electrical box and provide a rain tight enclosure for a wide range of standard electrical devices.

BACKGROUND OF THE INVENTION

Outdoor electrical outlets are commonly used to provide electrical service near gardens, swimming pools, patios and the like. Some of those used outdoors have a weatherproof enclosure for covering the outlets which may be thermostats, timers for watering systems, switches, and similar electrical devices. These outdoor enclosures are commonly referred to in the industry as FS or field service boxes.

Presently, popular forms of outlet covers for providing covers to existing electrical outlets requires that the installer purchase special mounting plates, manufactured specifically for that particular box, to configure the enclosure for the particular type of electrical service that is required. As many as approximately 50 different plates may be manufactured to provide for all the different types of electrical services that may be required in typical outdoor wiring applications. The requirement to provide a special plates increases the expense of the device and also requires the electrical distributor to increase inventory in order to stock all of the special plates.

The first advantage of this invention is that one configuration of the enclosure of this invention will accommodate a range of outdoor electrical devices whereas standard covers commonly used in the trade require a vast range of configurations to provide the same functionality.

A second advantage is that special electrical devices and mounting plates are not required. Standard electrical devices and standard face plates that are pre-existing with the electrical outlet are re-used.

SUMMARY OF THE INVENTION

This invention consists of an electrical enclosure that is used outdoors in conjunction with an existing standard electrical enclosure, either flush or surface mounted. The rear surface of the enclosure has an integral adapter plate that mates with the existing standard electrical box and creates a rain tight fit when a gasket is sandwiched between the two. The integral adapter plate is designed to accommodate a wide variety of standard electrical devices including common receptacles, twist lock plug receptacles, ground fault interrupt receptacles, switches, timers, and thermostats. The pre-existing plate is then used to seal the open area around the device mounted on the adapter plate. Special electrical covers for different boxes are therefore not required with the installation since the pre-existing devices and plates that are removed from the existing flush or surface mounted box may be re-used with the enclosure of this invention.

OBJECTS AND ADVANTAGES

The first object of this invention to provide a simple electrical box cover that may be installed outdoors over an existing junction box, either flush or surface mounted, to provide an enclosure for standard electrical devices and their plates.

A second object of the invention is to provide a universal box in one configuration that will accommodate a wide range of standard electrical devices and their plates. The invention eliminates the need for special devices and plates or multiple boxes having different configurations.

A third object of the invention is to provide a rain tight enclosure for mounting pre-existing electrical devices and plates. An integral adapter plate at the rear of the adapter box provides a rain tight fit when connected to the pre-existing junction box with a gasket sandwiched therebetween.

Other objects and advantages of the present invention will be better understood from the following description when read in conjunction with the appropriate drawings.

DESCRIPTION OF THE INVENTION

The invention is a universal electrical box cover that may be used outdoors in conjunction with a pre-existing standard outlet box either flush or surface mounted to a wall. Three separate parts; the open front enclosure having an integral adapter plate, the gasket, and the front cover member are interconnected to comprise the cover.

Figure 4:
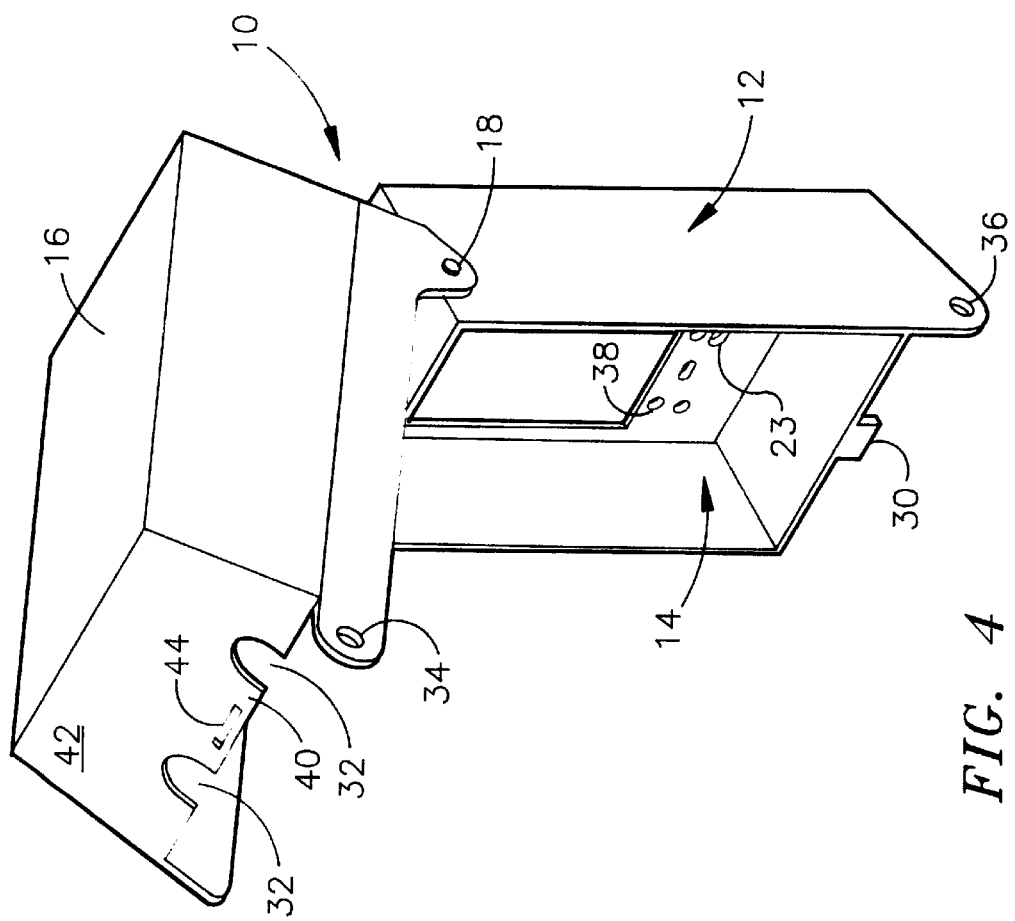
FIG. 4 is a perspective view of the universal electrical box cover including the integral adapter plate and front cover member pivoted to its upward or open position.

FIG. 4 is a perspective view of the universal electrical box cover 10 except for the gasket but including the open front enclosure 12 with the integral adapter plate 14, and the front cover member 16. Pins 18 connect front cover member 16 pivotally to the open front enclosure 12 at its upper end.

Figure 1:
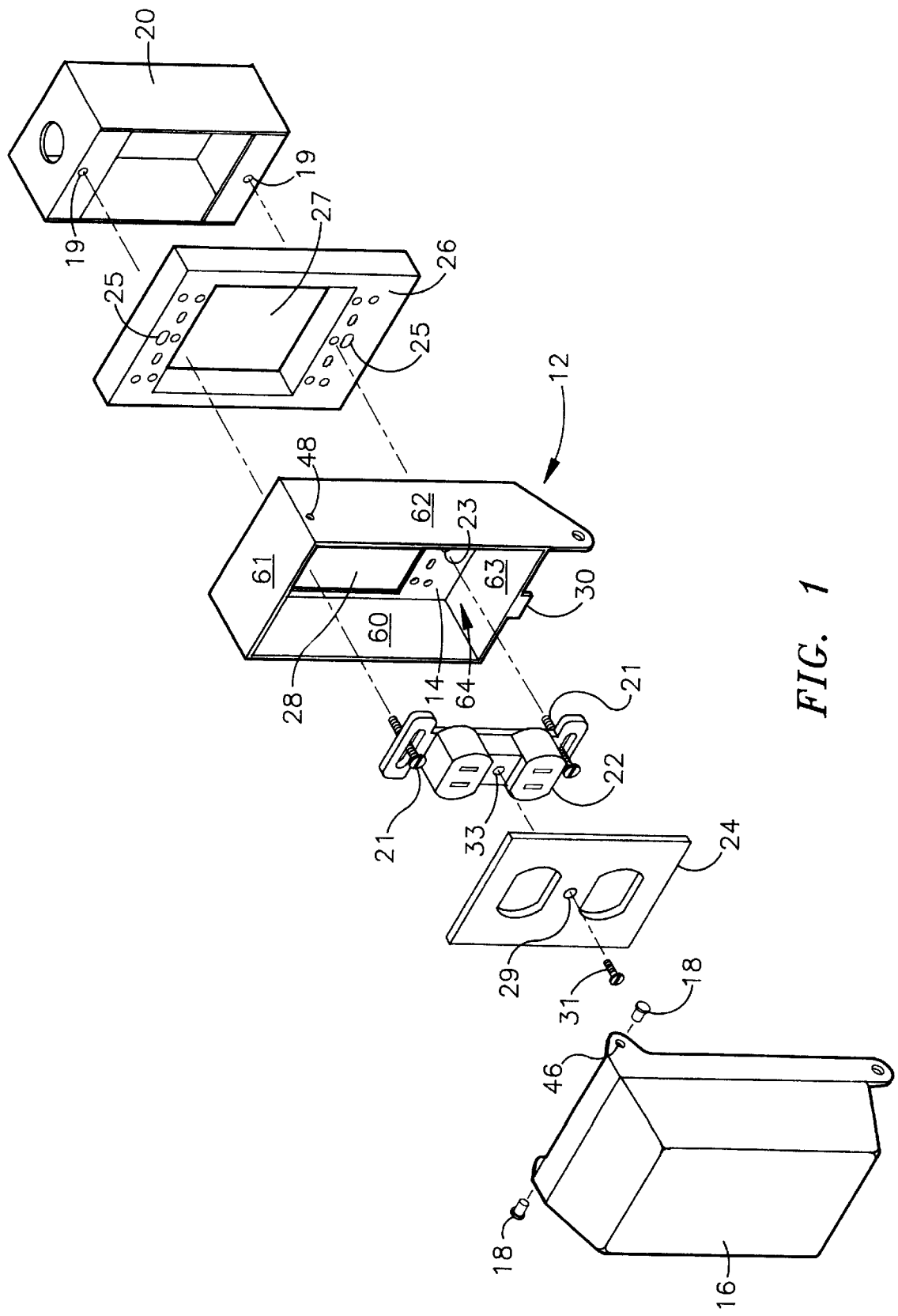
FIG. 1 is an exploded perspective view of the universal electrical box cover of the present invention together with pre-existing standard electrical components that are commonly used in conjunction with it.

The universal electrical box cover is used in conjunction with a pre-existing standard outlet box 20, a pre-existing standard electrical receptacle 22, and a pre-existing standard receptacle plate 24 as shown in FIG. 1. The standard outlet box 20 is typically an existing box that is either flush or surface mounted in an outdoor location. The pre-existing standard electrical receptacle 22 and pre-existing standard receptacle plate or cover 24 may be unfastened from the existing outdoor box and reused with the universal electrical cover of this invention. After the electrical power has been cut off, the electrical connections to the standard receptacle 22 need not be broken, as the receptacle may be unscrewed from the pre-existing outlet box 20 and pulled through the window or opening 27 in the gasket and the window or opening 28 in the adapter plate 14. The gasket 26 and the open front enclosure 12 are aligned with the pre-existing standard outlet box 20. The screws 21 that had previously held the receptacle to the outlet box 20 are then re-inserted through the ears of the standard receptacle 22, through the matching holes 23 in the integral adapter plate 14, and through the matching holes 25 in the gasket 26. The outer periphery of adapter plate or back plate 14 has both a front surface as shown in FIG. 1 and a back surface on the opposite side thereof. The screws 21 fasten into same threaded holes 19 in the pre-existing outlet box 20 that were previously used for fastening the receptacle. The screws 21 that are used to fasten the universal electrical cover to the existing outlet box are usually the same screws that were previously used to hold the receptacle to the outlet box.

As seen in FIG. 1 the pre-existing outlet box 20 has the threaded or screw receiving holes 19 in the front face thereof.

After the standard receptacle 22 is fastened securely to the pre-existing outlet box 20, holding the open front enclosure 12 and gasket 26 firmly in place, the pre-existing standard receptacle plate 24 is fastened to the receptacle in the usual manner using the pre-existing screw 31 through the pre-existing receptacle plate threaded hole 33. Although pictured separate of the enclosure 12, the front cover member 16 is pinned to the open front enclosure 12 when manufactured. As seen in FIGS. 1 to 4 the pins 18 have an enlarged head and are placed through holes 46 in cover member 16 and forced into holes 48 in enclosure 12 which have bosses 50 to accommodate the pins. The holes 46 are oversized so the cover member 16 is free to pivot.

The enclosure 12 has four side walls, 60, 61, 62, and 63, which enclose a chamber 64. The gasket is preferably made of closed cell weather resistant resilient foam and is substantially planar and of a size to overlay a substantial portion of the outside rear of the integral back plate 14.

The cover member 16 is simply rotated to its open position when connecting the open front enclosure 12 to the existing outlet box as previously described. A lip 30 is provided on the outer surface of the enclosure 12 at the lower end to provide a device for holding the cover member 16 in the closed position. Cover member 16 is constructed of plastic and a slotted tab (not shown in FIG. 1) on the cover mates with lip 30 which forces the tab outward. When the slot clears the lip 30 the lip snaps into the slot within the tab.

After the standard electrical receptacle 22 and standard plate 24 are fastened in the universal electrical cover as mentioned above and the cover member 16 is rotated to its closed position, the universal electrical cover is a rain tight enclosure that provides weather protection to the electrical devices enclosed within. The electrical devices could be any type of electrical service commonly used outdoors, including electrical receptacles, duplex receptacles, twist-lock receptacles, ground fault interrupt receptacles, switches, timers, etc.

Figure 3:
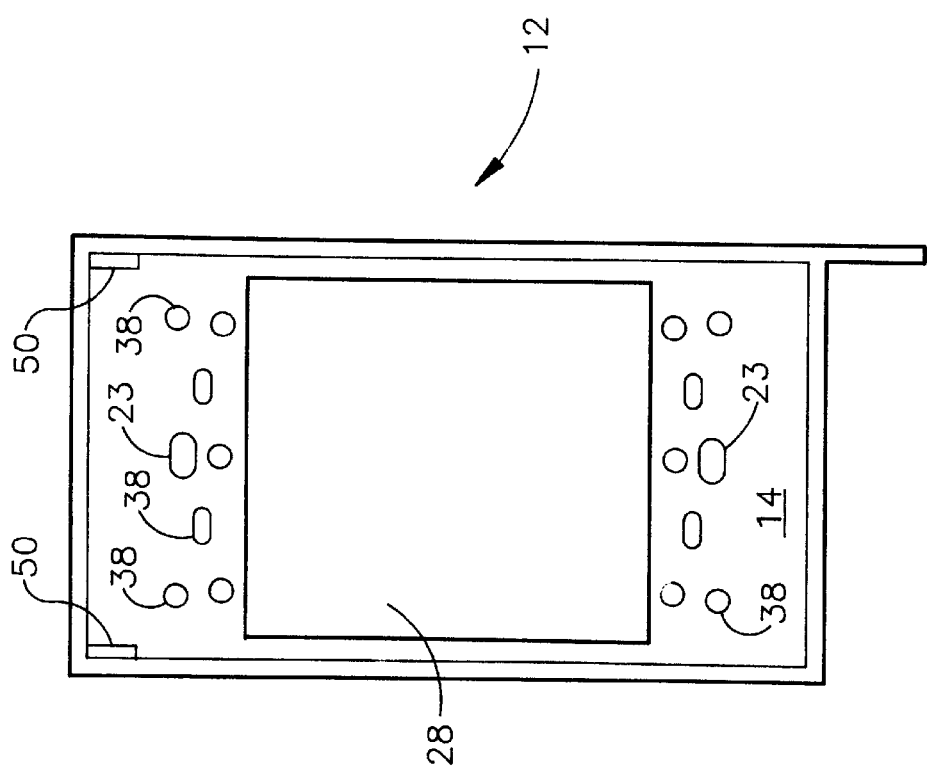
FIG. 3 is a frontal view of the universal electrical cover including an integral adapter plate located at the back of the dry box.

As shown in FIG. 3, in addition to holes 23 previously mentioned, several additional holes 38 are provided in the integral adapter plate 14 for connecting any of the various electrical devices that are commonly used in outdoor applications. Likewise, the gasket 26 has similar holes that align with the holes in adapter plate 14 as well with the window 27 and the outer periphery of the gasket 26 being coextensive with the window 28 and outer periphery of the adapter plate 14.

As shown in FIG. 4, the front cover member 16 has cord exit holes 32 cut in the bottom surface 42 to allow for the exit of electrical cords (not shown) that may be connected to a receptacle within the enclosure 12. The electrical cords, with the cover member 16 closed, may therefore be kept dry while plugged in. The cover member 16 has a locking hole 34 which mates with a locking hole 36 in the enclosure 12 to provide a means for locking the cover member to the enclosure. With the cover member 16 closed against the enclosure 12, the hasp of a padlock is simply slipped through the mating holes.

As shown in FIG. 4, a feature which provides rain tightness is the cavernous cover member 16 of the universal electrical cover 10. The cavernous cover member 16 provides ample space for the outward projection of thick cords that may be plugged into the receptacle within the cover.

FIG. 4 also shows the tab 40 on cover member 16 that mates with the lip 30 on the enclosure. Tab 40 has a slot 44 within it which the lip 30 of the dry box slips through to provide a locking feature for the cover.

Figure 2:
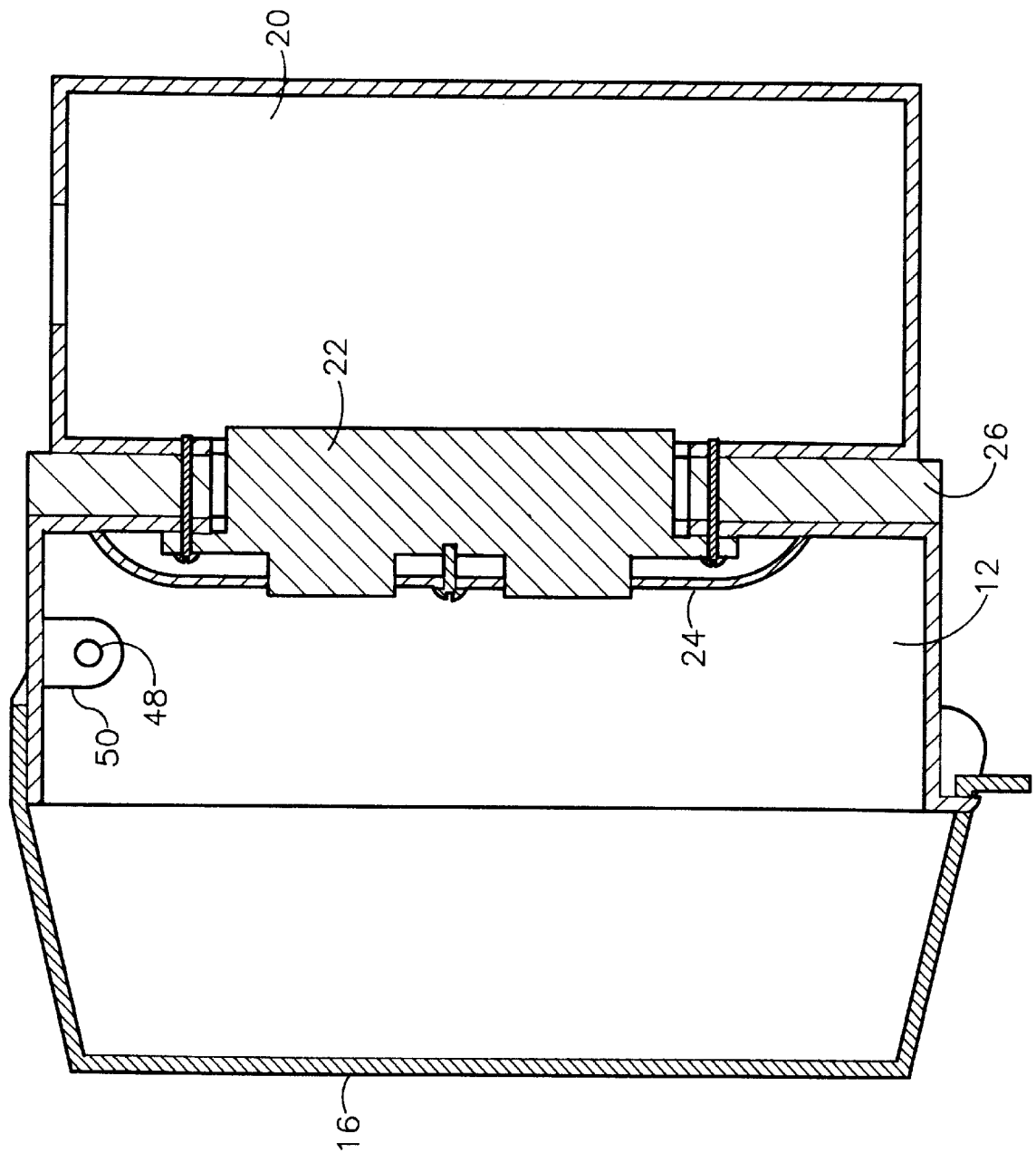
FIG. 2 is a cross-sectional view of the universal electrical box including a pre-existing standard receptacle and a pre-existing standard receptacle plate.

FIG. 2 shows a cross sectional view of the universal electrical cover 10 of this invention including the enclosure 12, gasket 26, and cover member 16. The universal electrical cover 10 is shown fastened in place to a pre-existing outlet box 20 with a pre-existing standard electrical receptacle 22 and a pre-existing standard receptacle plate 24 enclosed within.

Although there has been shown and described an example of what is at present considered the preferred embodiment of the present invention, it will be obvious to those skilled in the art that various changes and modifications may be made therein without departing from the scope of the invention as defined by the appended claims.

What is claimed is:

1. A universal electrical box cover for a pre-existing electrical outlet box which pre-existing electrical outlet box has a front face with screw receiving holes therein comprising:

an open front enclosure having four side walls surrounding a chamber and having a back plate that has an opening surrounded by a solid periphery, said opening allowing passage of wiring from the pre-existing box to said enclosure chamber, said periphery having a front surface and a rear surface adapted to having a pre-existing electrical device mounted on said front surface of said periphery which attaches said enclosure and said periphery and said electrical device to said pre-existing electrical outlet box and further adapted to having a pre-existing receptacle plate mounted thereon by being attached to said electrical device;

a gasket of a size to overlay a substantial portion of said rear surface of said periphery of said back plate; and a front cover member mounted on said enclosure to cover said electrical device, said cover having at least one cord outlet for allowing closure of said cover while one or more cords are installed.

2. The universal electrical cover of claim 1 wherein said enclosure has holes in said back plate, some of said holes adapted to accept pre-existing screws from said pre-existing electrical device and some of said holes are in alignment with pre-existing holes in said pre-existing electrical device and mounting holes or bosses in said pre-existing electrical outlet box.

3. The universal electrical cover of claim 2 wherein said gasket contains holes that align with said holes in said back plate.

4. The universal electrical cover of claim 1 wherein said front cover member has a recess permitting said cord or cords to be folded and passed through said cord outlet.

5. The universal electrical cover of claim 1 wherein an outer edge of said enclosure has an outward extending tab, said tab aligning with an edge of said cover member when said cover member is closed, said tab furthermore causing said cover member to snap fit upon said tab when said cover member is closed, said snap fit furthermore being overridable by pressure applied to pull said cover member open.

6. A method of converting a pre-existing outdoor electrical box to a rain tight outdoor electrical box comprising the steps of:

removing a pre-existing electrical device from said pre-existing outdoor electrical box;

providing a gasket and aligning said gasket with an opening in said pre-existing outdoor electrical box;

providing an open front enclosure having a pivoted cover member and having an integral back plate with an opening surrounded by a solid periphery and aligning said back plate against said gasket aligned with said pre-existing outdoor electrical box, said periphery having holes aligning with threaded screw holes in said pre-existing outdoor electrical box;

passing wiring from said pre-existing outdoor electrical box to said enclosure;

fastening by means of screws said enclosure and said electrical device to said pre-existing outdoor electrical box with said gasket sandwiched therebetween; and fastening by means of a screw a pre-existing receptacle plate to said electrical box.

* * * * *